(12) United States Patent
Tinlot

(10) Patent No.: US 7,741,797 B2
(45) Date of Patent: Jun. 22, 2010

(54) METHOD FOR MANAGING TRANSITIONS IN A THREE-PHASE BLDC MOTOR AND CORRESPONDING DEVICE

(75) Inventor: Eric Tinlot, Petit-Mars (FR)

(73) Assignee: Atmel Switzerland SARL, Fribourg (CH)

( * ) Notice: Subject to any disclaimer, the term of this patent is extended or adjusted under 35 U.S.C. 154(b) by 338 days.

(21) Appl. No.: 11/780,605

(22) Filed: Jul. 20, 2007

(65) Prior Publication Data

US 2008/0048594 A1 Feb. 28, 2008

(30) Foreign Application Priority Data

Jul. 20, 2006 (FR) .................................. 06 06702

(51) Int. Cl.
*H02P 6/16* (2006.01)
(52) U.S. Cl. ....................... 318/400.03; 318/400.14; 318/400.34
(58) Field of Classification Search .......... 318/700, 318/400.03, 400.04, 400.11, 400.13, 400.14, 318/400.32, 400.34
See application file for complete search history.

(56) References Cited

U.S. PATENT DOCUMENTS

| 4,514,667 | A | * | 4/1985 | Sakmann et al. ....... 318/400.01 |
| 4,764,711 | A | * | 8/1988 | Deller ......................... 318/619 |
| 5,530,326 | A | * | 6/1996 | Galvin et al. .......... 318/400.11 |
| 5,854,548 | A | * | 12/1998 | Taga et al. .................... 318/721 |
| 5,949,203 | A | * | 9/1999 | Buthker ................. 318/400.34 |
| 2004/0263104 | A1 | * | 12/2004 | Iwanaga et al. ............. 318/439 |
| 2006/0066280 | A1 | * | 3/2006 | Bhaumik et al. ............ 318/599 |

FOREIGN PATENT DOCUMENTS

| EP | 0429412 | 11/1990 |
| EP | WO 01/05023 | 1/2001 |
| JP | 04 261387 | 2/1991 |
| JP | 10 337080 | 6/1997 |

* cited by examiner

*Primary Examiner*—Bentsu Ro
(74) *Attorney, Agent, or Firm*—Jones Day

(57) ABSTRACT

A method is provided for managing at least one transition in a three-phase BLDC motor describing a cycle including six successive states, wherein the motor obtains first, second and third synchronization signals. The synchronization signals are respectively associated with first, second and third coils of the motor. The method includes the following steps, for each current transition associated with the switching of the motor from a current state to a next state: selecting a current synchronization signal on which the current transition is to appear; detecting the occurrence of the current transition on the current synchronization signal; and sending, to the motor, at least one current control signal so as to switch the motor from the current state to the next state.

18 Claims, 4 Drawing Sheets

PRIOR ART

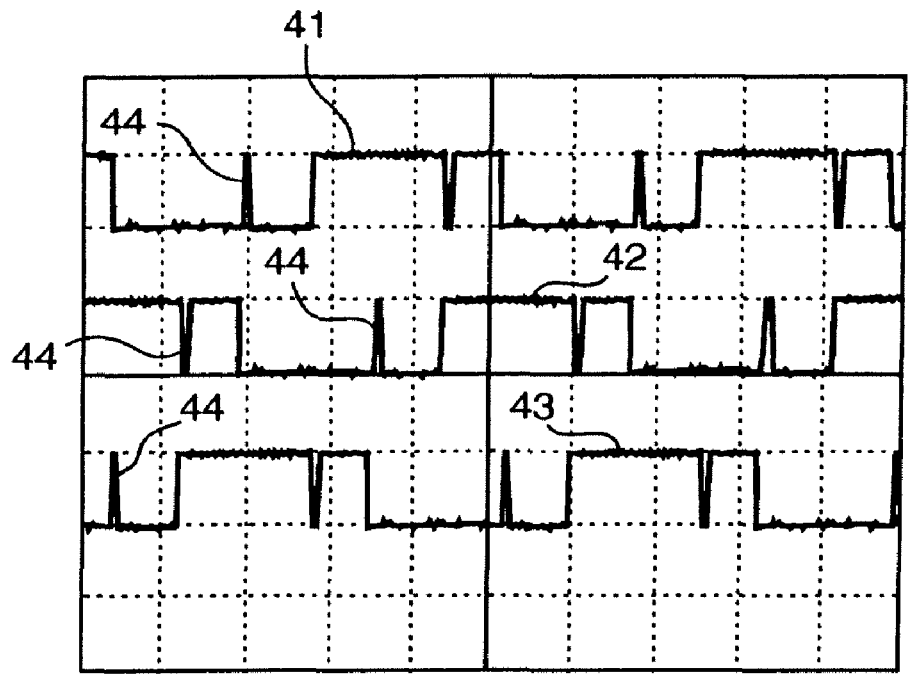
PRIOR ART    Fig. 4
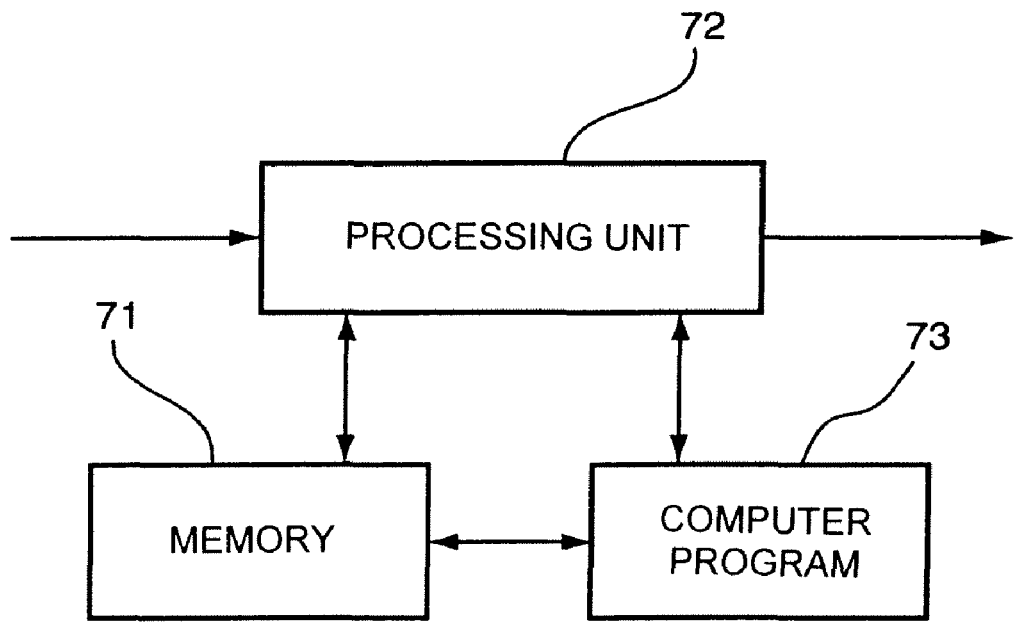
Fig. 5

US 7,741,797 B2

METHOD FOR MANAGING TRANSITIONS IN A THREE-PHASE BLDC MOTOR AND CORRESPONDING DEVICE

FIELD OF THE DISCLOSURE

The field of the disclosure is that of electric motors and more specifically brushless DC-type electric motors (also called "brushless DC motor" or "BLDC motor").

More specifically, the disclosure relates to techniques for controlling such electric motors.

BACKGROUND

FIGS. 1A to 1F show diagrams illustrating the six main states in which a three-phase brushless DC electric motor (hereinafter referred to as BLDC motor) can be found.

The three-phase BLDC motor 100 includes:
 a stator 110 itself including first 111, second 112 and third 113 coils secured to a chassis 114;
 a rotor 120 of which the magnet directions are shown by the arrows 121.

A control circuit including a control circuit and a power circuit (not shown) makes it possible to operate the motor.

Thus, as shown successively by FIGS. 1A to 1F, the rotor 120 is animated by a rotary movement around an axis 130, which causes the motor to successively adopt the six states of FIGS. 1A to 1F, while the stator remains immobile. This rotary movement is initiated and maintained by magnetic fields generated successively in the three coils, with the generation of these fields being controlled by control signals transmitted by the control circuit.

The switching from a current state of the motor 100 to a next state is therefore done by sending, to each coil of the motor, two control signals, by means of the power circuit, with the control signals being dependent on the position of the rotor with respect to the coils of the stator (i.e. the state of the motor).

To determine which control signals must be sent, conventionally, in three-phase BLDC motors, either Hall-effect sensors or a circuit for obtaining synchronisation signals (belonging to the control circuit) have been implemented.

Indeed, the signals from the sensors or the circuit for obtaining synchronisation signals make it possible to have access to the following information:
 when it is necessary to switch the motor from one state to another state (transition) by sending adapted control signals;
 which control signals must be sent to the coils of the motor (which amounts to knowing which state the motor must switch to).

It is assumed below that the motor 100 of FIG. 1 is a sensorless motor, i.e. it implements a circuit for obtaining synchronisation signals. The synchronisation signals are obtained on the basis of the measurement of counter electromotive forces generated in the motor.

FIG. 2 shows an example of a circuit 200 for obtaining synchronisation signals of the motor 100 mentioned above (for example the module sold by the ATMEL company under reference AT90PWM3).

The circuit 200 for obtaining synchronisation signals includes first 201, second 202 and third 203 inputs supplied by signals respectively coming from the first, second and third coils of the motor.

It also includes a filtering stage 210 including low-pass filters that make it possible to filter the control signals of the coils and any high-frequency parasitic signals.

It then includes first 221, second 222 and third 223 comparators that respectively compare:
 the third input signal 203 and the midpoint of the first 201 and second 202 input signals once filtered by the filtering stage 210;
 the first input signal 201 and the midpoint of the third 203 and second 202 input signals once filtered by the filtering stage 210;
 the second input signal 202 and the midpoint of the first 201 and third 203 input signals once filtered by the filtering stage 210.

The outputs of the first 221, second 222 and third 223 comparators respectively constitute first 231, second 232 and third 233 outputs of the circuit 200 on which first, second and third synchronisation signals are respectively delivered.

The circuit 200 for obtaining synchronisation signals is commonly used to synthesise synchronisation signals equivalent to those of the three-phase BLDC motors equipped with Hall-effect sensors.

FIG. 3 shows first 31, second 32 and third 33 theoretical synchronisation signals from the circuit 200 as a function of time.

Thus, by reading the value of the three synchronisation signals and knowing the direction of rotation of the motor, it is possible, in a transition (identified by a rising edge or a falling edge at the level of one of the synchronisation signals), to determine which state the motor must switch to and therefore which control signals to send to it.

Indeed, the standard processing of transitions (implemented by the conventional control circuit) includes the following steps:
 monitoring the occurrence of transitions, each being identified by a rising edge or a falling edge, on each of the three synchronisation signals;
 detecting an edge (representing a transition) on one of the synchronisation signals;
 when the transition is detected, reading the current state of each of the three synchronisation signals so as to determine (knowing the direction of rotation of the motor) the position of the rotor with respect to the stator and therefore which control signal values to send to the coils of the motor;
 sending the appropriate control signals to the coils of the motor so as to switch the motor from the current state to the next state;
 optionally masking, during a small time zone just after the control signals are sent (so as to avoid interference associated with the switching in progress), the synchronisation signals.

A problem with this mode of processing transitions is related to the fact that the synchronisation signals are parasitic (or disrupted):
 on the one hand, by the chopping frequency of PWM (Pulse Width Modulation) controls;
 on the other hand, by the current peaks and/or the demagnetisation peaks associated with the effect of the controls in particular on the coils of the motor.

Indeed, even if the interference of synchronisation signals associated with the chopping frequency can be limited by the filtering stage 210 of the circuit 200, the current and/or demagnetisation peaks of the coils are almost impossible to filter.

As shown in FIG. 4 (which shows first 41, second 42 and third 43 real synchronisation signals from the circuit 200 as a function of time), these current and/or demagnetisation peaks disrupt the synchronisation signals generated. Indeed, this interference of the synchronisation signals is characterised by the appearance of parasitic peaks 44 that lead in particular to erroneous transition detections and/or erroneous control signal determinations.

The parasitic peaks 44 are dependent on electric parameters (in particular the resistance and the inductance) of the motor and can be present in each of the states of the motor.

SUMMARY

A method is provided for managing at least one transition in a three-phase BLDC motor describing a cycle including six successive states, wherein said motor obtains first, second and third synchronisation signals, with said synchronisation signals being respectively associated with first, second and third coils of said motor.

The method includes the following steps, for each current transition associated with the switching of the motor from a current state to a next state:
- selecting a current synchronisation signal on which said current transition is to appear;
- detecting the occurrence of said current transition on said current synchronisation signal;
- sending, to said motor, at least one current control signal so as to switch the motor from the current state to the next state.

An exemplary principle of the method is based on the minimal use of the data contained in the synchronisation signals owing to the prediction of the occurrence of transitions on the basis of the rotation speed of the motor and its direction of rotation.

Indeed, on the basis of the rotation speed of the motor and its direction of rotation, it is possible to first calculate when and on which synchronisation signals the rising or falling edges (representing transitions) are to occur, and also to first determine, for each of the transitions, which control signals must be sent to the motor.

Thus, the management method according to an illustrative example makes it possible to not implement the conventional step of reading synchronisation signals (so as to determine the control signals to be sent to the motor at a given time), and thus to prevent errors in interpretation of the synchronisation signals (leading to erroneous control signals) associated with the presence of parasitic peaks.

In addition, this method makes it possible (by implementing only the monitoring of the synchronisation signal on which the edge representing the transition is to take place) to reduce the occurrence of erroneous transition detections associated with the presence of parasitic peaks, due to the fact that the other synchronisation signals are not monitored.

The detection step is preferably preceded by a step of identifying data representing the current transition.

Thus, by precisely knowing the data representing the transition, it is possible to filter any other information that might be erroneously interpreted as being the information representing the transition.

According to an illustrative, advantageous feature of the disclosure, said data representing the current transition belongs to the group including:
- the rising edges of the current synchronisation signal;
- the falling edges of the current synchronisation signal.

The method preferably includes a preliminary step of determining, for each of the transitions, a predetermined time range in which said step of detecting the occurrence of said current transition is implemented.

According to an illustrative example, the determination step takes into account at least one of the parameters belonging to the group including:
- the rotation speed of the motor;
- the direction of rotation of the motor.

The method according to an illustrative example advantageously also includes a step of masking the current synchronisation signal, which masking is performed after the occurrence of said current transition, during a given time period.

Thus, owing to the implementation of this masking, on the monitored synchronisation signal, during periods in which no transition is to occur, the occurrence of erroneous transition detections associated with the presence of parasitic peaks is also reduced.

In addition, it is due to the prediction of the occurrence of the transitions that this masking step can be implemented during the entire period extending from the current transition to the next transition.

The duration of the time is calculated dynamically as a function of the rotation speed of the motor.

The management method according to an illustrative example preferably includes a step of generating said at least one current control signal on the basis of said current transition, the rotation speed of the motor and the direction of rotation of the motor.

The disclosure also relates to a device for managing at least one transition in a three-phase BLDC motor describing a cycle including six successive states, wherein said motor obtains first, second and third synchronisation signals, which synchronisation signals are respectively associated with first, second and third coils of said motor, which device includes, for each current transition associated with the switching of the motor from a current state to the next state:
- means for selecting a current synchronisation signal, on which said current transition is to appear;
- means for detecting the occurrence of said current transition on said current synchronisation signal;
- means for sending, to said motor, at least one current control signal so as to switch the motor from the current state to the next state.

The disclosure also relates to a computer program product that can be downloaded from a communication network and/or saved on a computer-readable medium and/or ran by a processor, characterised in that it includes program code instructions for implementing the method for managing at least one transition as described above.

The advantages of the management device and the computer program product are the same as those of the management method, and will not be described in greater detail.

BRIEF DESCRIPTION OF THE DRAWINGS

Other features and advantages of the invention will appear more clearly upon reading the following description of a simple illustrative and non-limiting example, and the appended drawings.

FIG. 4 shows real graphs of the first, second and third synchronisation signals as a function of time, from the circuit of FIG. 2.

FIG. 5 shows the simplified structure of a transition management circuit according to a specific example of the disclosure.

DETAILED DESCRIPTION OF ILLUSTRATIVE EMBODIMENTS

Figure 1:
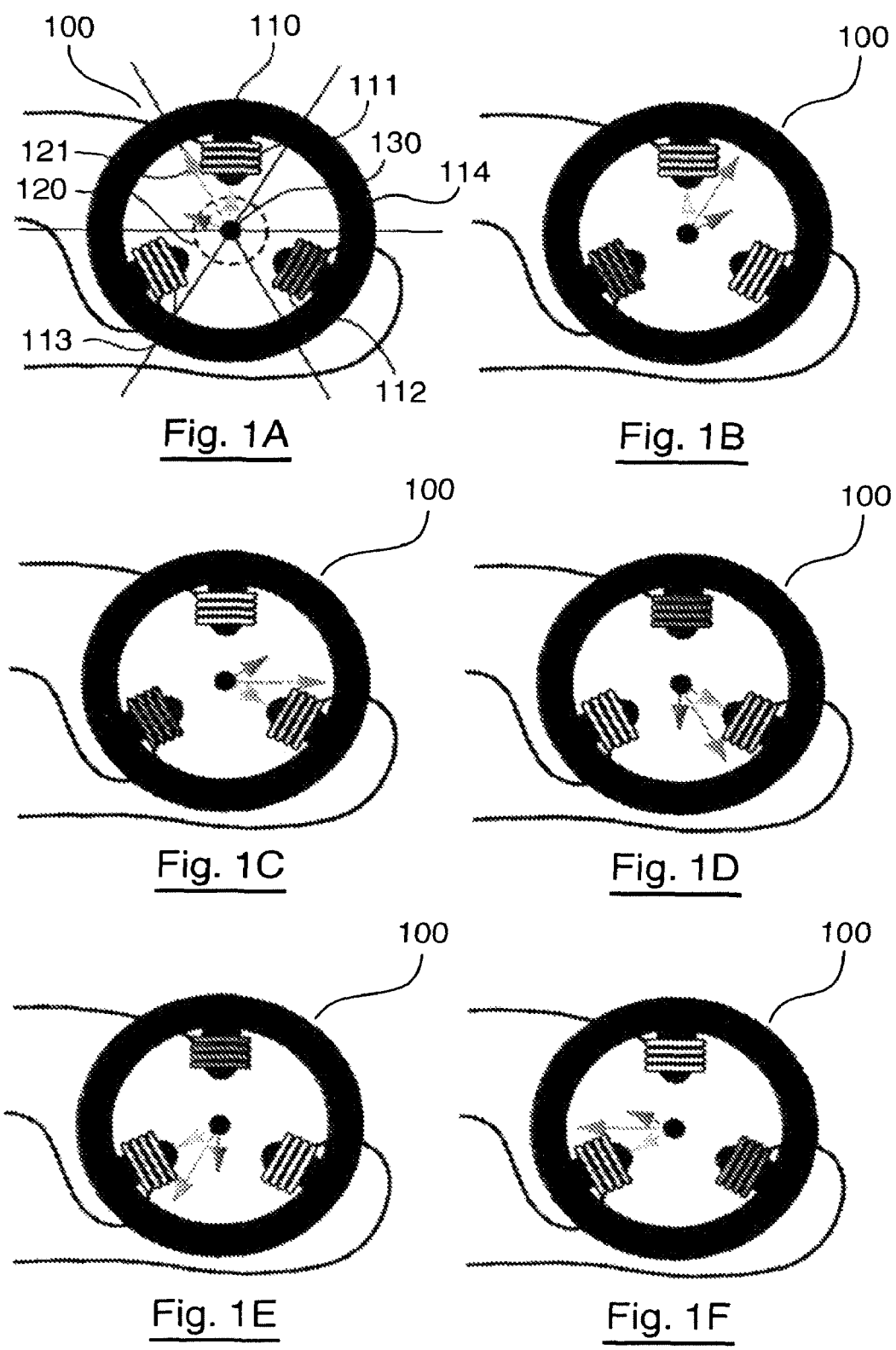
FIGS. 1A to 1F show diagrams illustrating the six main states in which a conventional three-phase BLDC electric motor can be found.
Figure 2:
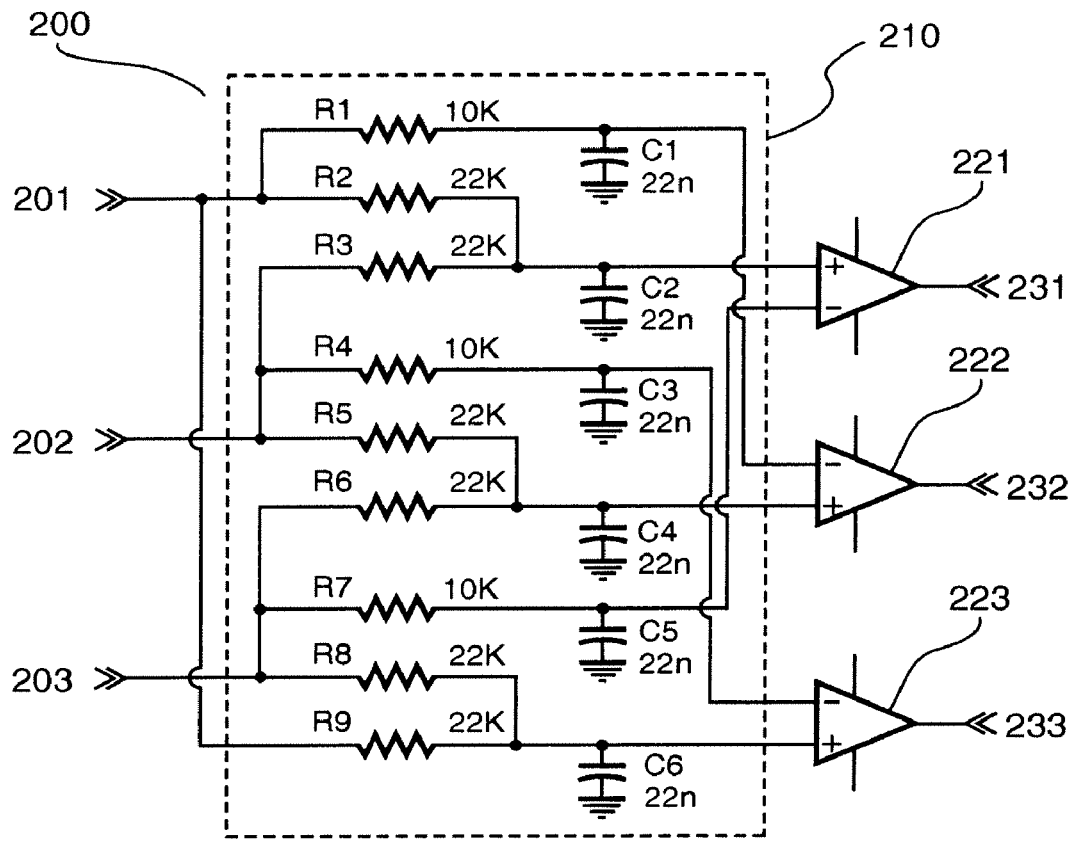
FIG. 2 shows an example of a circuit for obtaining synchronisation signals of the three-phase BLDC motor of FIG. 1.
Figure 3:
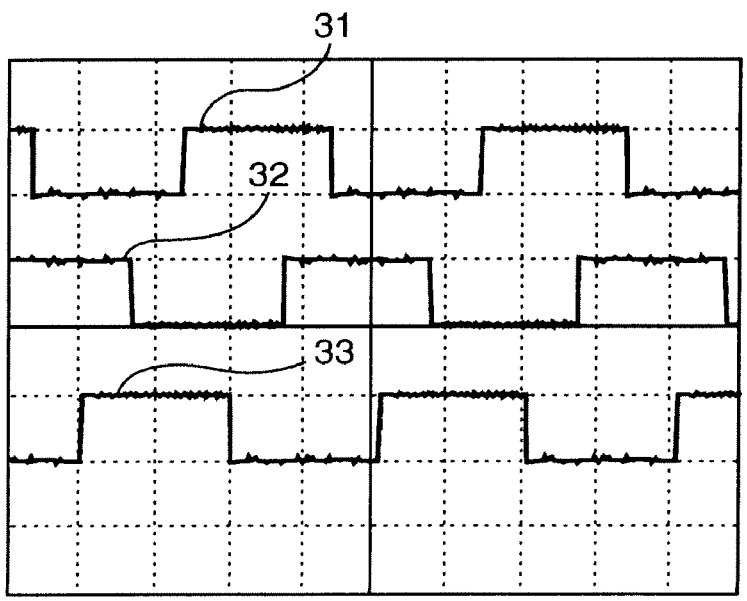
FIG. 3 shows theoretical graphs of the first, second and third synchronisation signals as a function of time, from the circuit of FIG. 2.

Below, we will discuss, according to a specific example of the disclosure, the three-phase BLDC motor 100 of FIG. 1, including a motor control circuit, itself including a transition management circuit according to the present disclosure (which is, for example, the module sold by the ATMEL company under reference AT90PWN3, hereinafter described in relation to FIG. 5), the circuit for obtaining synchronisation signals of FIG. 2 and a power circuit supplying power to the coils of the motor. It is assumed that the direction of rotation of the motor and the rotation speed are known.

Thus, in the context of the disclosure, the transition management circuit replaces the aforementioned conventional control circuit.

The method for managing transition (implemented by the transition management device according to the disclosure) according to an example of the disclosure includes a preliminary step of determining (as a function of the rotation speed of the motor and the direction of rotation of the motor), for each of the transitions:

a time range of an edge (rising or falling) representing the transition (or data representing the transition);

the synchronisation signal on which the edge representing the transition is located.

And, for each of the transitions, and in particular for a current transition associated with the switching of a motor from a first state, called the current state, to a second state, it also includes the following steps.

selecting a synchronisation signal, called a current synchronisation signal, on which the edge representing the current transition is to appear;

monitoring the current synchronisation signal so as to detect the edge;

when the edge is detected, determining the position of the rotor with respect to the stator and therefore the values of the control signals to be sent to the coils of the motor so as to cause the motor to switch from the first to the second state;

generating current control signals on the basis of the knowledge of the edge, the rotation speed of the motor and the direction of rotation of the motor;

sending control signals to the coils of the motor so as to switch the motor from the current state to the next state.

For example, the method according to an example also includes a step of determining, on the basis of the knowledge of the state of the motor (obtained during the previous transition), since the edge representing the current transition is a rising edge or a falling edge.

Thus, this makes it possible to reduce the risk of erroneous detection of the edge.

In the case of a software implementation of the method, the transitions can be implemented in the form of interruptions.

According to a specific example of the disclosure, the management method also includes a step of masking the current synchronisation signal, implemented just after the current transition. This masking is performed during a given time flow.

For example, the duration of the time is calculated dynamically as a function of the rotation speed of the motor.

The duration of the time can be provided as a function of the rotation speed of the motor by means, for example, of a circuit for measuring the rotation speed.

The management method is implemented by the aforementioned transition management circuit.

FIG. 5 shows the simplified structure of a circuit (or device) for managing transitions in a three-phase BLDC motor describing a cycle including six successive states, according to the specific example of the disclosure mentioned above.

As shown in FIG. 5, such a transition management circuit includes a memory 71, a processing unit 72 equipped for example with a microprocessor µP, and controlled by the computer program 73, implementing the transition management method according to an illustrative example of the disclosure.

On initialisation, the computer program code instructions 43 are, for example, loaded into a RAM memory before being executed by the processor of the processing unit 72.

The microprocessor of the processing unit 72 implements the steps of the transition management method described above, so as to cause the rotation of the motor.

To do this, the transition management circuit:

receives the synchronisation signals from the circuit for obtaining synchronisation signals, and includes, for each current transition associated with the switching of the motor from a current state to a next state:

means for selecting a current synchronisation signal, on which said current transition is to appear;

means for detecting the occurrence of said current transition on said current synchronisation signal;

means for sending, to the motor, current control signals (control signals that the transition management circuit generates) so as to switch the motor from the current state to the next state.

These means are controlled by the microprocessor of the processing unit 72.

Figure 6:
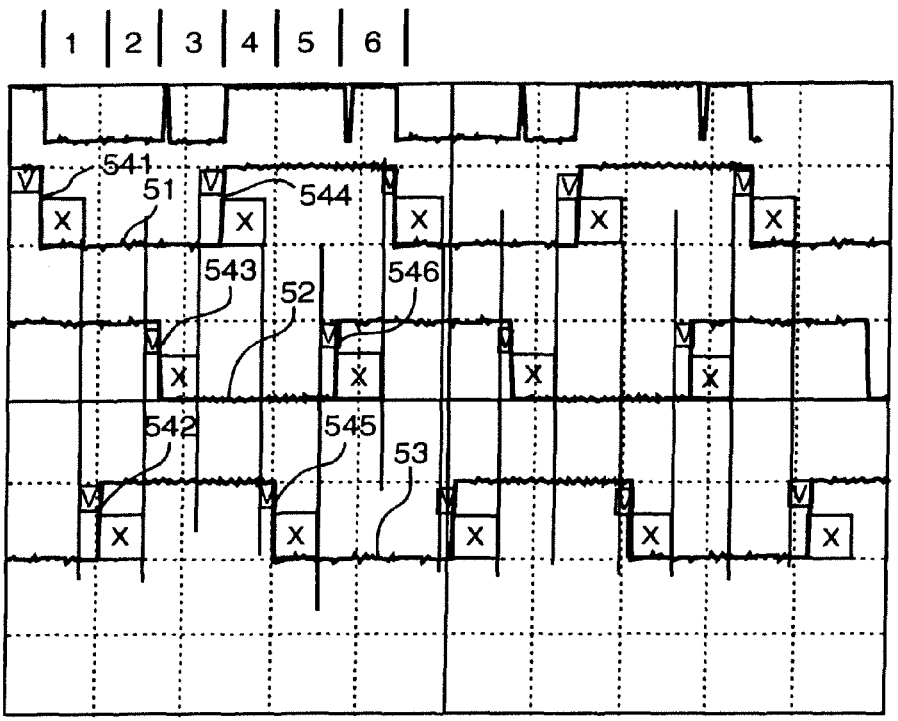
FIG. 6 shows a graph illustrating the change over time of the first, second and third synchronisation signals as well as the implementation of the management method according to a specific example of the disclosure.

FIG. 6 shows a graph illustrating the change over time of the first 51, second 52 and third 53 synchronisation signals (obtained by the circuit for obtaining synchronisation signals) as well as the implementation of the management method according to the specific example of the disclosure (implemented by the transition management circuit).

This FIG. 6 shows, with a "v", the time zones where the monitoring of the occurrence of a transition on the current synchronisation signal is implemented and, with an "x", the time zones in which the monitoring of the occurrence of a transition on the current synchronisation signal is not implemented (i.e. the current synchronisation signal is masked from the point of view of the transition management circuit).

The time during which the current synchronisation signal is masked (time zone marked by an "x") is chosen so that it begins just after the edge representing the current transition and it ends just before the edge representing the next transition.

Thus, the period (time zone marked by a "v") during which the current synchronisation signal is not masked (i.e. the monitoring of the occurrence of a transition is implemented) corresponds to a short period just before the edge representing the current transition.

In a cycle of the motor, it goes respectively through the six states mentioned above (FIGS. 1A to 1F):

a falling edge 541 of the first synchronisation signal represents the first transition corresponding to the switch from the sixth state (FIG. 1F) to the first state (FIG. 1A) of the motor 100;

a rising edge 542 of the third synchronisation signal represents the second transition corresponding to the switching from the first state (FIG. 1A) to the second state (FIG. 1B);

a falling edge 543 of the second synchronisation signal represents the third transition corresponding to the switching from the second state (FIG. 1B) to the third state (FIG. 1C);

a rising edge 544 of the first synchronisation signal represents the fourth transition corresponding to the switching from the third state (FIG. 1C) to the fourth state (FIG. 1D);

a falling edge 545 of the third synchronisation signal represents the fifth transition corresponding to the switching from the fourth state (FIG. 1D) to the fifth state (FIG. 1E);

a rising edge 546 of the second synchronisation signal represents the sixth transition corresponding to the switching from the fifth state (FIG. 1E) to the sixth state (FIG. 1F).

Figure 7:
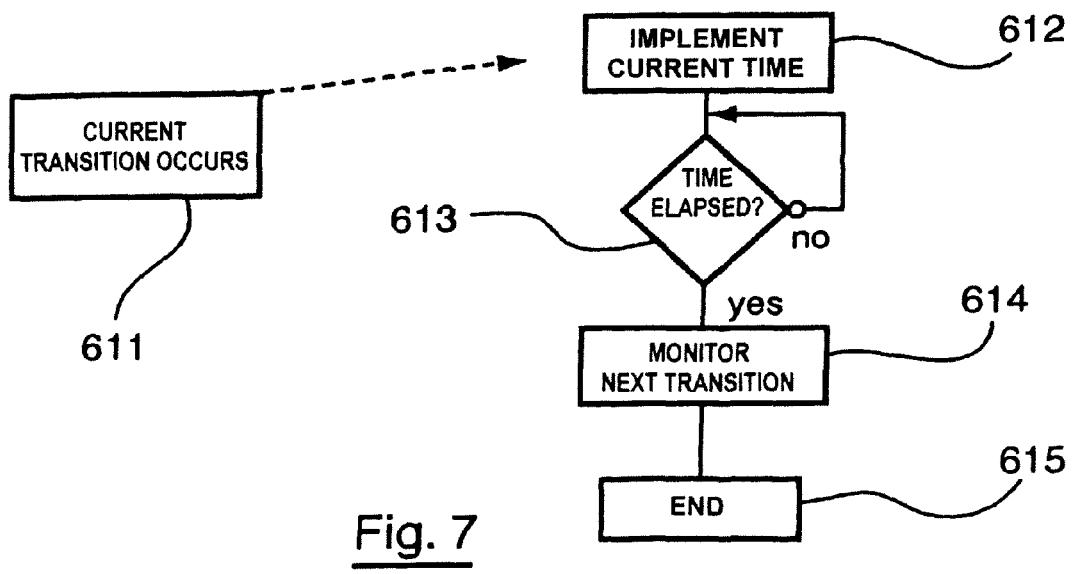
FIG. 7 shows a diagram of the steps of the management method, according to the specific example of the disclosure, implemented during a half-cycle of the motor.

FIG. 7 shows a diagram of the steps of the management method, according to the specific example, implemented by the transition management circuit during a half-cycle of the motor.

For example, the half-cycle in which the aforementioned first, second and third transitions (in relation to FIG. 6) are produced. The same steps are carried out during the half-cycle in which the aforementioned fourth, fifth and sixth transitions occur.

We will now describe the case in which the rotation speed of the motor is fixed and constant.

In a step 611, a current transition (respectively the first, second or third transition) of the motor 100 occurs.

Then:
the monitoring of the occurrence of the current transition on the current synchronisation signal is deactivated;
the value of the current synchronisation signal is raised;
the next synchronisation signal (on which the edge identifying the next transition is to occur) is selected on the basis of the value of the current synchronisation signal, the speed and the direction of rotation of the motor;
a transition monitoring algorithm (described below) is implemented.

In step 612, in the initialisation of the transition monitoring algorithm, a current time is implemented between the end of the current transition and the start of the next transition.

In step 613, the method verifies whether the current time has lapsed.

If the current time has lapsed, in a step 614, the method implements a monitoring of the occurrence of the next transition (respectively the second, the third or the fourth transition) on the next synchronisation signal (respectively the third, the second or the first synchronisation signal).

Then, in a step 615, the transition monitoring algorithm is ended before the step 611 is implemented again.

However, if the current time has not lapsed at the time of verification of step 613, then step 613 is implemented again.

In at least one example of the disclosure, a technique is provided for processing transitions for a three-phase BLDC motor using a circuit for obtaining synchronisation signals that makes it possible to significantly reduce the problems related to the interference of the synchronisation signals.

In at least one example, such a technique makes it possible in particular to prevent erroneous transition detections or erroneous control signal determinations.

In at least one example, such a technique is easy and inexpensive to implement.

Although the present disclosure has been described with reference to one or more examples, workers skilled in the art will recognize that changes may be made in form and detail without departing from the scope of the disclosure and/or the appended claims.

What is claimed is:

1. Method for managing at least one transition in a three-phase BLDC motor describing a cycle including six successive states, wherein said motor obtains first, second and third synchronisation signals, which are respectively associated with first, second and third coils of said motor,
wherein, for each current transition associated with the switching of the motor from a current state to a next state, the method includes the following steps:
selecting a current synchronisation signal on which said current transition is to appear;
monitoring the current synchronisation signal but not other synchronisation signals;
detecting the occurrence of said current transition on said current synchronisation signal;
masking the current synchronisation signal, after the occurrence of said current transition, during a given time period;
sending, to said motor, at least one current control signal so as to switch the motor from the current state to the next state; and
determining, for each current transition, a predetermined time range in which said step of detecting the occurrence of said current transition is implemented.

2. Method according to claim 1, wherein the step of detecting is preceded by a step of identifying information representing the current transition.

3. Method according to claim 2, wherein said information representing the current transition belongs to the group including:
rising edges of the current synchronisation signal;
falling edges of the current synchronisation signal.

4. Method according to claim 1, wherein said step of determining takes into account at least one of the parameters belonging to the group including:
rotation speed of the motor; direction of rotation of the motor.

5. Method according to claim 1, wherein the duration of the time period is calculated dynamically as a function of rotational speed of the motor.

6. Method according to claim 1, wherein the method includes a step of generating said at least one current control signal on the basis of said current transition, rotation speed of the motor and direction of rotation of the motor.

7. Device for managing at least one transition in a three-phase BLDC motor describing a cycle including six successive states, wherein said motor obtains first, second and third synchronisation signals, which are respectively associated with first, second and third coils of said motor,
wherein the device includes, for each current transition associated with the switching of the motor from a current state to a next state:
means for selecting a current synchronisation signal, on which said current transition is to appear;
means for monitoring the current synchronisation signal but not the other synchronisation signals;

means for detecting the occurrence of said current transition on said current synchronisation signal;

means for masking the current synchronisation signal, after the occurrence of said current transition, during a given time period;

means for sending, to said motor, at least one current control signal so as to switch the motor from the current state to the next state; and means for determining, for each current transition, a predetermined time range in which the means for detecting the occurrence of said current transition are activated.

8. The device of claim 7 further comprising means for identifying information representing the current transition.

9. The device of claim 8 wherein said information representing the current transition belongs to the group including:

rising edges of the current synchronisation signal;

falling edges of the current synchronisation signal.

10. The device of claim 7, wherein the means of determining takes into account at least one of the parameters belonging to the group including:

rotation speed of the motor and direction of rotation of the motor.

11. The device of claim 7 wherein the duration of the time period is calculated dynamically as a function of rotational speed of the motor.

12. The device of claim 7 further comprising means for generating said at least one current control signal on the basis of said current transition, rotation speed of the motor, and direction of rotation of the motor.

13. Computer program product stored on a computer-readable medium and comprising program code instructions for implementing a method for managing at least one transition in a three-phase BLDC motor describing a cycle including six successive states, wherein said motor obtains first, second and third synchronisation signals, which are respectively associated with first, second and third coils of said motor, wherein, for each current transition associated with the switching of the motor from a current state to a next state, the method comprises:

selecting a current synchronisation signal on which said current transition is to appear;

monitoring the current synchronisation signal but not other synchronisation signals;

detecting the occurrence of said current transition on said current synchronisation signal;

masking the current synchronisation signal, after the occurrence of said current transition, during a given time period;

sending, to said motor, at least one current control signal so as to switch the motor from the current state to the next state; and determining, for each current transition, a predetermined time range in which said step of detecting the occurrence of said current transition is implemented.

14. The computer program product of claim 13 wherein the method further comprises identifying information representing the current transition.

15. The computer program product of claim 14 wherein said information representing the current transition belongs to the group including:

rising edges of the current synchronisation signal;

falling edges of the current synchronisation signal.

16. The computer program product of claim 13, wherein the method step of determining takes into account at least one of the parameters belonging to the group including:

rotation speed of the motor and direction of rotation of the motor.

17. The computer program product of claim 13 wherein the duration of the time period is calculated dynamically as a function of rotational speed of the motor.

18. The computer program product of claim 13 wherein the method further comprises generating said at least one current control signal on the basis of said current transition, rotation speed of the motor, and direction of rotation of the motor.

* * * * *